United States Patent
Mulholland et al.

(10) Patent No.: US 11,518,545 B2
(45) Date of Patent: Dec. 6, 2022

(54) SUPPLEMENTAL COOLING UNIT PREDICTION SYSTEM

(71) Applicant: The Boeing Company, Chicago, IL (US)

(72) Inventors: Jared D. Mulholland, Lake Stevens, WA (US); Hamid R. Nikjou, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 500 days.

(21) Appl. No.: 16/693,183

(22) Filed: Nov. 22, 2019

(65) Prior Publication Data

US 2020/0331636 A1    Oct. 22, 2020

Related U.S. Application Data

(60) Provisional application No. 62/835,097, filed on Apr. 17, 2019.

(51) Int. Cl.
| | |
|---|---|
| *B64F 5/60* | (2017.01) |
| *B64D 45/00* | (2006.01) |
| *G05B 15/02* | (2006.01) |
| *G06Q 10/10* | (2012.01) |
| *B64D 13/06* | (2006.01) |
| *G06Q 10/00* | (2012.01) |

(52) U.S. Cl.
CPC ............ *B64F 5/60* (2017.01); *B64D 45/00* (2013.01); *G05B 15/02* (2013.01); *G06Q 10/1097* (2013.01); *G06Q 10/20* (2013.01); *B64D 2045/0085* (2013.01)

(58) Field of Classification Search
USPC ........................................ 701/29.4
See application file for complete search history.

(56) References Cited

U.S. PATENT DOCUMENTS

| | | | |
|---|---|---|---|
| 8,365,514 B1 * | 2/2013 | Kupratis | F02K 3/062 60/262 |
| 2013/0327729 A1* | 12/2013 | Apostolides | F17D 1/14 210/97 |
| 2016/0230659 A1* | 8/2016 | Gu | B64D 33/08 |
| 2018/0031290 A1 | 2/2018 | Ho et al. | |
| 2021/0248840 A1 | 8/2021 | Megchiani et al. | |

FOREIGN PATENT DOCUMENTS

WO        2015124889 A1     8/2015

OTHER PUBLICATIONS

Office Action, dated Jun. 6, 2022, regarding U.S. Appl. No. 16/785,366, 20 pages.

* cited by examiner

*Primary Examiner* — Tyler D Paige
(74) *Attorney, Agent, or Firm* — Yee & Associates, P.C.

(57) ABSTRACT

A method, apparatus, and system for managing a supplemental cooling unit. The process receives data for a supplemental cooling unit. The data comprises a pressure, a temperature, and a speed. The process generates a set of alerts based on the data for the supplemental cooling unit and a signature in the data.

20 Claims, 7 Drawing Sheets

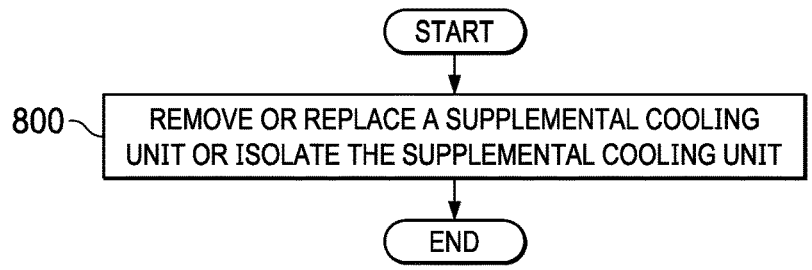
FIG. 8
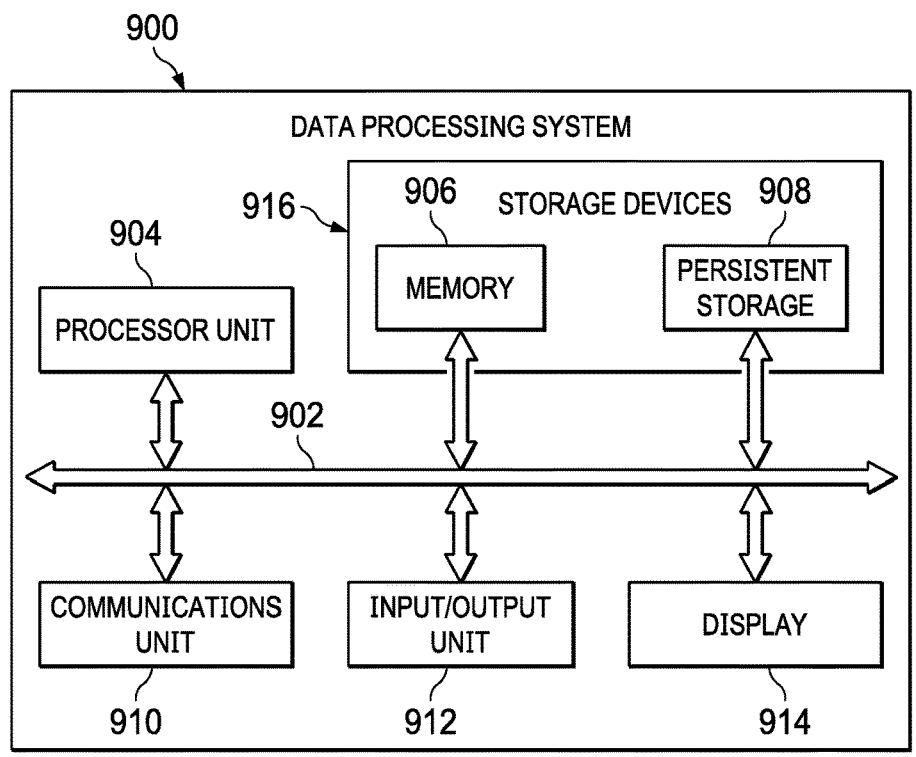
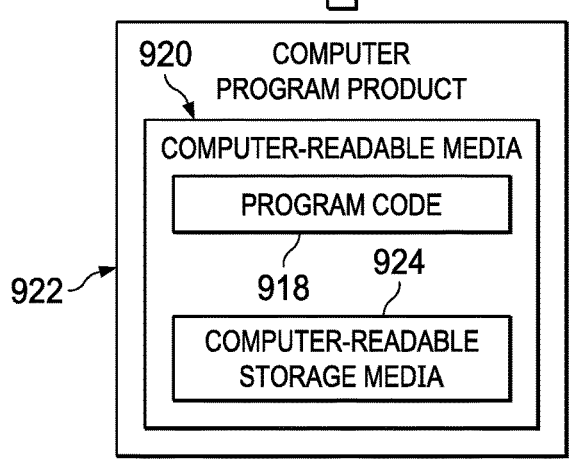
FIG. 9

SUPPLEMENTAL COOLING UNIT PREDICTION SYSTEM

RELATED PROVISIONAL APPLICATION

This application is related to and claims the benefit of priority of provisional U.S. Patent Application Ser. No. 62/835,097, entitled "Supplemental Cooling Unit Prediction System", filed on Apr. 17, 2019, which is hereby incorporated by reference.

BACKGROUND INFORMATION

1. Field

The present disclosure relates generally to aircraft and, in particular, to maintaining aircraft systems. Still more particularly, the present disclosure relates to a method, apparatus, and system for predicting when a supplemental cooling unit may no longer perform within specifications for the supplemental cooling unit.

2. Background

Aircraft maintenance is performed to ensure that an aircraft or an aircraft part will continue to operate with a desired level of performance. Aircraft maintenance can include overhaul, inspection, placement, nonconformance rectification, modifications, or other operations to maintain performance of an aircraft part.

SUMMARY

An embodiment of the present disclosure provides a method for managing a supplemental cooling unit. The process receives data for a supplemental cooling unit. The data comprises a pressure, a temperature, and a speed. The process generates a set of alerts based on the data for the supplemental cooling unit and a signature in the data.

Another embodiment of the present disclosure provides an aircraft management system. The aircraft management system comprises a computer system in a system manager in the computer system. The system manager receives data for a supplemental cooling unit, wherein the data comprises a pressure, a temperature, and a speed and generates a set of alerts based on the data for the supplemental cooling unit and a signature in the data.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 8 is an illustration of a flowchart of an example of a process for managing a supplemental cooling unit in accordance with an illustrative embodiment;

FIG. 9 is an illustration of a block diagram of a data processing system in accordance with an illustrative embodiment;

DETAILED DESCRIPTION

The illustrative embodiments recognize and take into account one or more different considerations. The illustrative embodiments recognize and take into account that it is desirable to perform maintenance on an aircraft system prior to the aircraft system registering a nonconformance mode and potentially requiring a delay or cancellation of a flight. The illustrative embodiments also recognize and take into account that it is desirable to perform maintenance on an aircraft system in a manner that reduces the amount of maintenance but in a manner that avoids a nonconformance of the aircraft system. The illustrative embodiments also recognize and take into account that it is desirable to reduce repair costs for an aircraft system by early failure detection.

In the illustrative examples, a method can predict a nonconformance of a supplemental cooling unit where a nonconformance mode can be seen by monitoring the fluid temperature, motor speed, and fluid pressure. In the illustrative example, the fluid temperature and the fluid pressure are for a refrigerant fluid. In one illustrative example, a general pattern for this nonconformance mode can be seen by an increase in outlet pressure and temperature and a decrease in speed over time.

An aircraft condition monitoring system (ACMS) is a hardware system in an aircraft that monitors sensor parameters in the aircraft. This system can collect sensor data from sensors for different aircraft systems in the aircraft during different phases of flight such as during takeoff and cruise phases of flight. The sensor data for these parameters are aircraft condition monitoring system data and can be included as part of an integrated cooling system (ICS) performance report generated by the aircraft condition monitoring system. The integrated cooling system performance report includes information about the integrated cooling system in an aircraft. The integrated cooling system can provide refrigerated air for the interior of the aircraft. This report can include sensor data for a supplemental cooling unit in the integrated cooling system.

Figure 1:
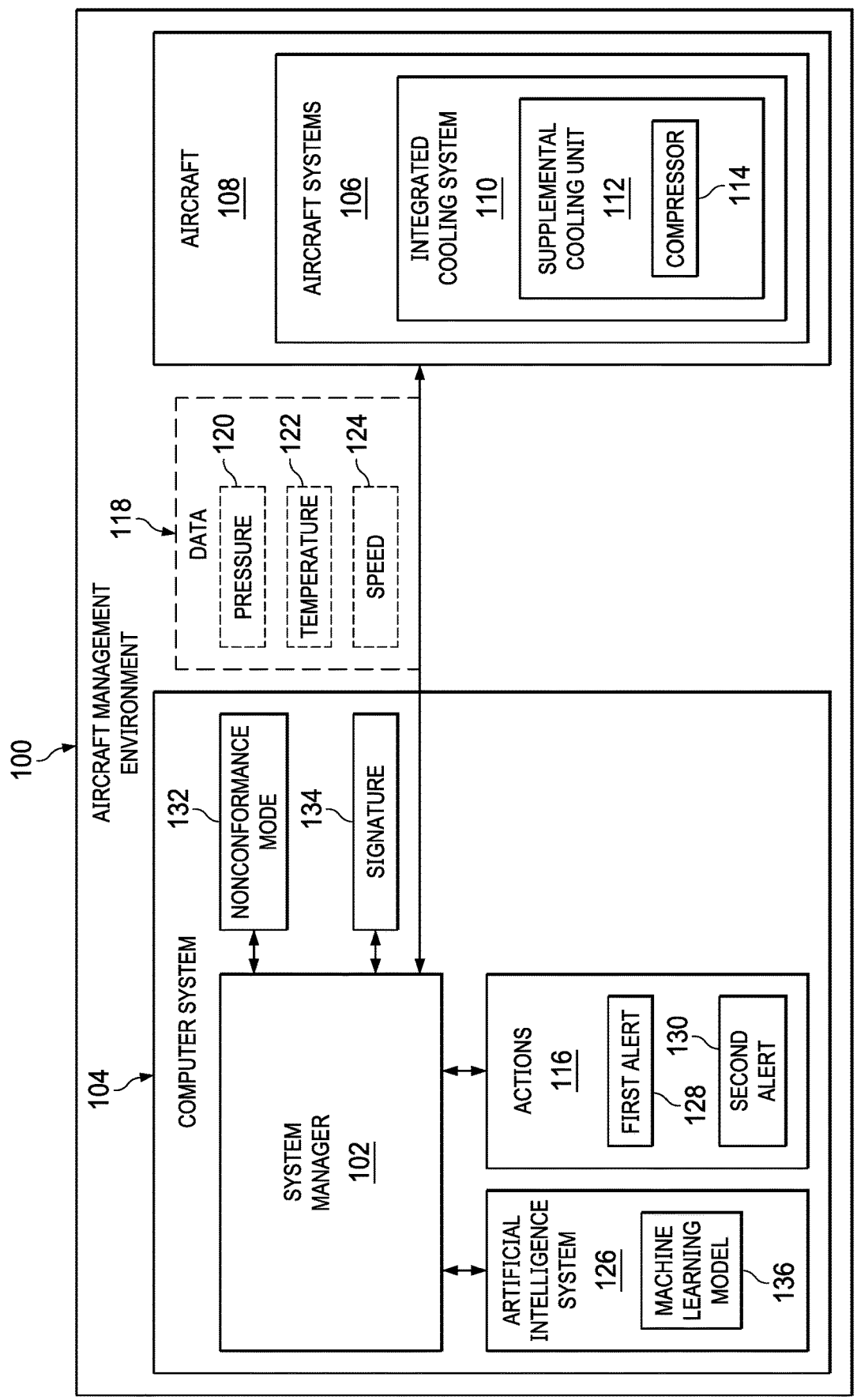
FIG. 1 is an illustration of a block diagram of an aircraft management environment in accordance with an illustrative embodiment.

With reference to FIG. 1, an illustration of a block diagram of an aircraft management environment is depicted in accordance with an illustrative embodiment. In this illustrative example, aircraft management environment 100 includes system manager 102 in computer system 104. System manager 102 operates to manage maintenance for aircraft systems 106 and aircraft 108.

System manager 102 can be implemented in software, hardware, firmware or a combination thereof. When software is used, the operations performed by system manager 102 can be implemented in program code configured to run on hardware, such as a processor unit. When firmware is used, the operations performed by system manager 102 can be implemented in program code and data and stored in persistent memory to run on a processor unit. When hardware is employed, the hardware can include circuits that operate to perform the operations in system manager 102.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 104 is a physical hardware system and includes one or more data processing systems. When more than one data processing system is present in computer system 104, those data processing systems are in communication with each other using a communications medium. The communications medium can be a network. The data processing systems can be selected from at least one of a computer, a server computer, a tablet computer, or some other suitable data processing system.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, aircraft systems 106 includes integrated cooling system 110. Integrated cooling system 110 can provide cooling within aircraft 108 such as for galleys in aircraft 108. Integrated cooling system 110 can be used to provide cooling to the galleys in aircraft 108 to keep food and beverages cool. As depicted, supplemental cooling unit 112 is a cooling source for integrated cooling system 110. Supplemental cooling unit 112 includes compressor 114. In this illustrative example, compressor 114 can be a scroll compressor.

In this illustrative example, system manager 102 can manage supplemental cooling unit 112. For example, system manager 102 can predict when maintenance is needed for supplemental cooling unit 112. For example, system manager 102 can determine when compressor 114 operates in a manner that causes supplemental cooling unit 112 to no longer function with a desired level of performance. This prediction can be made before supplemental cooling unit 112 no longer operates as desired or per the specification for supplemental cooling unit 112.

Further, system manager 102 can perform actions 116 based on predicting when maintenance is needed. In this illustrative example, actions 116 can be selected from at least one of generating an alert, sending a message, scheduling maintenance, or other suitable actions.

As depicted, system manager 102 receives data 118 from the operation of supplemental cooling unit 112. Data 118 can be received many times during the flight of aircraft 108. For example, a first set of data 118 can be received during a climb phase of flight of the aircraft and a second set of data 118 can be received during a cruise phase of flight of aircraft 108.

In this illustrative example, data 118 includes pressure 120, temperature 122, and speed 124 measured for supplemental cooling unit 112. As depicted, pressure 120 is a compressor outlet pressure for compressor 114, and temperature 122 is the temperature for a refrigerant fluid in compressor 114. For example, temperature 122 can be the discharge temperature for a refrigerant fluid leaving compressor 114. Speed 124 is the speed at which compressor 114 operates. This data can be received in reports such as an integrated cooling system (ICS) performance report for integrated cooling system 110.

In this illustrative example, system manager 102 can determine when nonconformance mode 132 is present. Nonconformance mode 132 indicates that compressor 114 is likely out-of-specification or will be out-of-specification at some point in time.

When nonconformance mode 132 is present, system manager 102 can generate first alert 128 and second alert 130 using data 118. In this illustrative example, first alert 128 is when a clog in a filter of supplemental cooling unit 112 has occurred. A clog can be present when the filter has become at least partially obstructed. The clog can be identified when pressure 120 and temperature 122 in data 118 increase to exceed thresholds for values of these parameters in signature 134 in data 118 and when speed 124 in signature 134 in data 118 decreases. In some illustrative examples, the thresholds may be selected as values that are met or exceeded rather than just exceeded.

As depicted, data 118 for signature 134 can be from a flight or aircraft 108, multiple flights of aircraft 108, or from a portion of the flight of aircraft 108. Further, signature 134 can be received in real-time during the flight of aircraft 108. In other words, data 118 is received in real-time during the flight of aircraft 108 in some illustrative examples.

In this illustrative example, pressure 120 and temperature 122 remain fairly consistently elevated. In this illustrative example, signature 134 comprises a pattern of data. As depicted, signature 134 is a pattern for data 118 and can be a subset of parameters in data 118 comprising pressure 120, temperature 122, and speed 124 collected from aircraft 108. In other examples, the parameters in data 118 can be the same as those parameters in signature 134. Signature 134 can be analyzed to determine trends or patterns in data 118 that can indicate that supplemental cooling unit 112 is not operating as desired. Signature 134 can also be analyzed to determine trends or patterns in data 118 that predict a failure of supplemental cooling unit 112 within a window such as a widow of time or a window of a number of flights.

In this illustrative example, second alert 130 is a supplement to first alert 128. Second alert 130 can be generated at a later time, such as when the clog in the filter is great enough that the compressor cannot operate for normal operation. In this illustrative example, the determination of when to generate second alert 130 can be based more on speed 124. In this illustrative example, a threshold for speed 124 in signature 134 can be set to determine when compressor 114 can no longer operate as desired. In other words, when speed 124 for compressor 114 falls below the threshold, compressor 114 will no longer perform as desired in supplemental cooling unit 112. The performance level for compressor 114 can be determined, for example, using manufacturer specifications for supplemental cooling unit 112.

These alerts can be based on signature 134. As depicted, signature 134 can be determined using data such as the data for pressure, temperature, and speed in the graphs in FIG. 3.

In one illustrative example, the thresholds for these values can be selected by artificial intelligence system 126. Artificial intelligence system 126 can be trained using historical data to determine values that indicate when a clog has occurred and to determine values that indicate when the clog in the filter is great enough that the compressor cannot operate for normal operation.

In this illustrative example, system manager 102 can determine when maintenance is needed for supplemental cooling unit 112 using artificial intelligence system 126. Artificial intelligence system 126 is a system that has intelligent behavior and can be based on function of the human brain. An artificial intelligence system comprises at least one of an artificial neural network, a cognitive system, a Bayesian network, a fuzzy logic, an expert system, a natural language system, or some other suitable system. Machine learning is used to train the artificial intelligence system. Machine learning involves inputting data into the process and allowing the process to adjust and improve the function of the artificial intelligence system.

For example, artificial intelligence system 126 includes a set of models that can operate to identify signature 134 in data 118 received from aircraft 108 in in which signature 134 can indicates when nonconformance mode 132 is present from in aircraft 108. Signature 134 can provide values for generating first alert 128 and second alert 130. For example, signature 134 can include values for at least one of pressure 120, temperature 122, or speed 124 that results in generating a set of alerts such as first alert 128 and second alert 130. System manager 102 can generate either or both alerts depending on the particular implementation.

As used herein, the term a "set of," when used with reference to items, means one or more items. For example, a "set of alerts" means one or more alerts.

In one illustrative example, artificial intelligence system 126 includes machine learning model 136, which has been trained to detect nonconformance mode 132. In this illustrative example, machine learning model 136 can be a random forest model or some other suitable type of machine learning model in artificial intelligence system 126. Machine learning model 136 can be trained to generate both first alert 128 and second alert 130.

In one illustrative example, one or more technical solutions are present that overcome a technical problem with an unexpected nonconformance of a supplemental cooling. As a result, one or more technical solutions can provide a technical effect of providing an ability to predict when a supplemental cooling unit will likely be out-of-specification such that maintenance can be scheduled for the supplemental cooling unit.

Computer system 104 can be configured to perform at least one of the steps, operations, or actions described in the different illustrative examples using software, hardware, firmware, or a combination thereof. As a result, computer system 104 operates as a special purpose computer system in which system manager 102 in computer system 104 enables predicting when supplemental cooling will no longer function as desired. In particular, system manager 102 transforms computer system 104 into a special purpose computer system as compared to currently available general computer systems that do not have system manager 102.

The illustration of aircraft management environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, system manager 102 can operate to manage one or more supplemental cooling units in addition to or in place of supplemental cooling unit 112. Additionally, system manager 102 can be located in aircraft 108 or at a remote location to aircraft 108.

As another illustrative example, machine learning model 136 can be trained to generate first alert 128. Another machine learning model can be trained to generate second alert 130.

Figure 2:
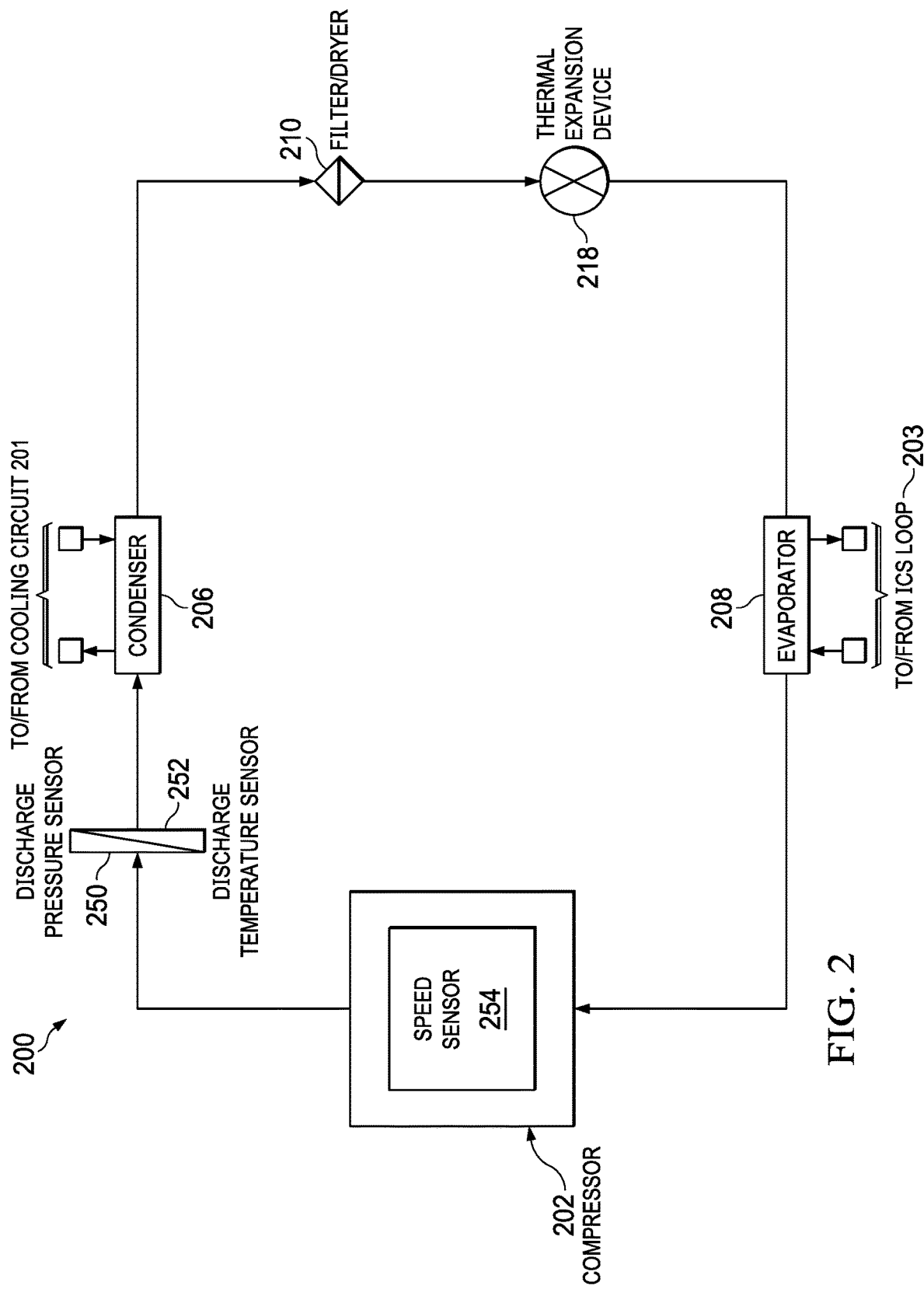
FIG. 2 is an illustration of a supplemental cooling unit (SCU) that can be managed in accordance with an illustrative embodiment.

With reference now to FIG. 2, an illustration of a supplemental cooling unit that can be managed is depicted in accordance with an illustrative embodiment. A supplemental cooling unit may experience a lower than desired level of reliability. Supplemental cooling unit 200 is an example of an implementation of supplemental cooling unit 112 shown in block form in FIG. 1.

In this depicted illustration, supplemental cooling unit 200 comprises a number of different components. As depicted, supplemental cooling unit 200 includes compressor 202, condenser 206, evaporator 208, filter/dryer 210, and thermal expansion device 218.

As depicted, compressor 202 operates to force a refrigerant gas to pass through condenser 206. Condenser 206 operates to condense the refrigerant gas through cooling. In this illustrative example, cooling circuit 201 functions as a heat exchanger to extract heat from the refrigerant gas in condenser 206. Heat can be drawn from condenser 206 through cooling circuit 201.

Evaporator 208 provides cooling to integrated cooling system (ICS) loop 203. This loop provides cooling within aircraft such as to components in a galley in the cabin of an aircraft.

Filter/dryer 210 is the component that can become clogged during operation of supplemental cooling unit 200. Thermal expansion device 218 produces cooling energy by expanding the refrigerant when the refrigerant passes through thermal expansion device 218. Thermal expansion device 218 can be, for example, a valve, an orifice, or some other device that causes the refrigerant to expand.

In this example, pressure 120 in FIG. 1 can be detected by discharge pressure sensor 250 located downstream of compressor 202. In this illustrative example, discharge pressure sensor 250 is located between compressor 202 and condenser 206.

As depicted, temperature 122 in FIG. 1 is the temperature for a refrigerant fluid downstream of compressor 202. As depicted, temperature 122 is detected by discharge temperature sensor 252, which is also located between compressor 202 and condenser 206. For example, temperature 122 can be the discharge temperature for a refrigerant fluid leaving compressor 114. As depicted, discharge pressure sensor 250 and discharge temperature sensor 252 can be integrated in a single component.

Speed 124 is the speed at which compressor 114 operates. This data can be received in reports such as an integrated cooling system performance report for integrated cooling system 110.

In this illustrative example, the speed of compressor 202 can be detected by speed sensor 254 for compressor 202.

The illustration of supplemental cooling unit 200 is provided as an illustration of one supplemental cooling unit that can be managed by system manager 102 in FIG. 1 and not meant to limit the manner in which a supplemental cooling unit can be implemented in an aircraft for management by system manager 102.

Further, supplemental cooling unit 200 can include other components that are not shown. These other components are not shown for purposes of not obscuring a description of the illustrative example. For example, supplemental cooling unit 200 can include a temperature fuse, charge ports for the compressor and flash tank. Supplemental cooling unit 200 can also include additional valves or sensors.

Thus, system manager 102 in FIG. 1 can be used to reduce at least one of the supplemental cooling unit maintenance cost, repair cost, or flight delay for aircraft 108 for a supplemental cooling unit such as supplemental cooling unit 200 in FIG. 2. For example, system manager 102 can be implemented as a prognostic tool to at least one of predict or detect supplemental cooling unit nonconformances.

In one example implementation, system manager 102 operating as a prognostic tool can monitor the compressor outlet pressure, temperature, and speed using airplane condition monitoring system (ACMS) data. Airplane condition monitoring system (ACMS) data is an example of data 118 that can be used by system manager 102 in FIG. 1.

By monitoring these parameters, a nonconformance signature can be identified by system manager 102 and used to predict when a failure may occur. For example, system manager 102 can monitor the compressor outlet pressure and temperature and determine threshold values for when a supplemental cooling unit has a clog occurring from increased pressure and increased temperature. These values can be threshold values. Further, at these threshold values for decreased performance, the speed can be monitored for a point where the speed begins to decrease to generate a first alert.

Machine learning methods can be used to train machine learning models, including random forest models, for use in increasing the accuracy of the prognostic tool in detecting these thresholds.

A nonconformance mode for the supplemental cooling unit can occur when the supplemental cooling unit compressor runs at a speed that causes the compressor to become unstable or no longer perform according to specifications. For example, a portion of the coating inside of the compressor can become dislodged over time. The dislodged coating can then travel downstream and engage, and at least partially obstruct ("clog"), the supplemental cooling unit filter such as in filter/dryer 210 in FIG. 2.

This nonconformance mode can be detected by monitoring the refrigerant fluid temperature, the refrigerant fluid pressure, and compressor motor speed. The general pattern for this nonconformance mode can be seen by an increase in outlet pressure and temperature and a decrease in speed over time. This pattern can form signature 134 which can be used to determine when alerts are generated. These parameters are available in the aircraft condition monitoring system data as part of the integrated cooling system performance report.

Utilizing this prognostic tool enables initiating an action to remove a supplemental cooling unit upon indication of a clogged filter and indication of the maintenance messages associated with the clogged filter. Removing the supplemental cooling unit from the aircraft can reduce at least one of the supplemental cooling unit maintenance cost, repair cost, or flight delay. The use of the tool can also enable effective management of inventory and allocation of parts.

In the illustrative example, the training data used for training machine learning models and for determining whether to generate alerts can be obtained from the integrated cooling system performance reports. Each of these reports has many parameters that are collected multiple times per flight. For example, the reports can include a first reading that is taken at climb and a second reading take is taken at cruise. At least one of the compressor discharge temperature, outlet pressure and speed could be used to predict and/or identify a supplemental cooling unit that is decreasing in performance.

Figure 3:
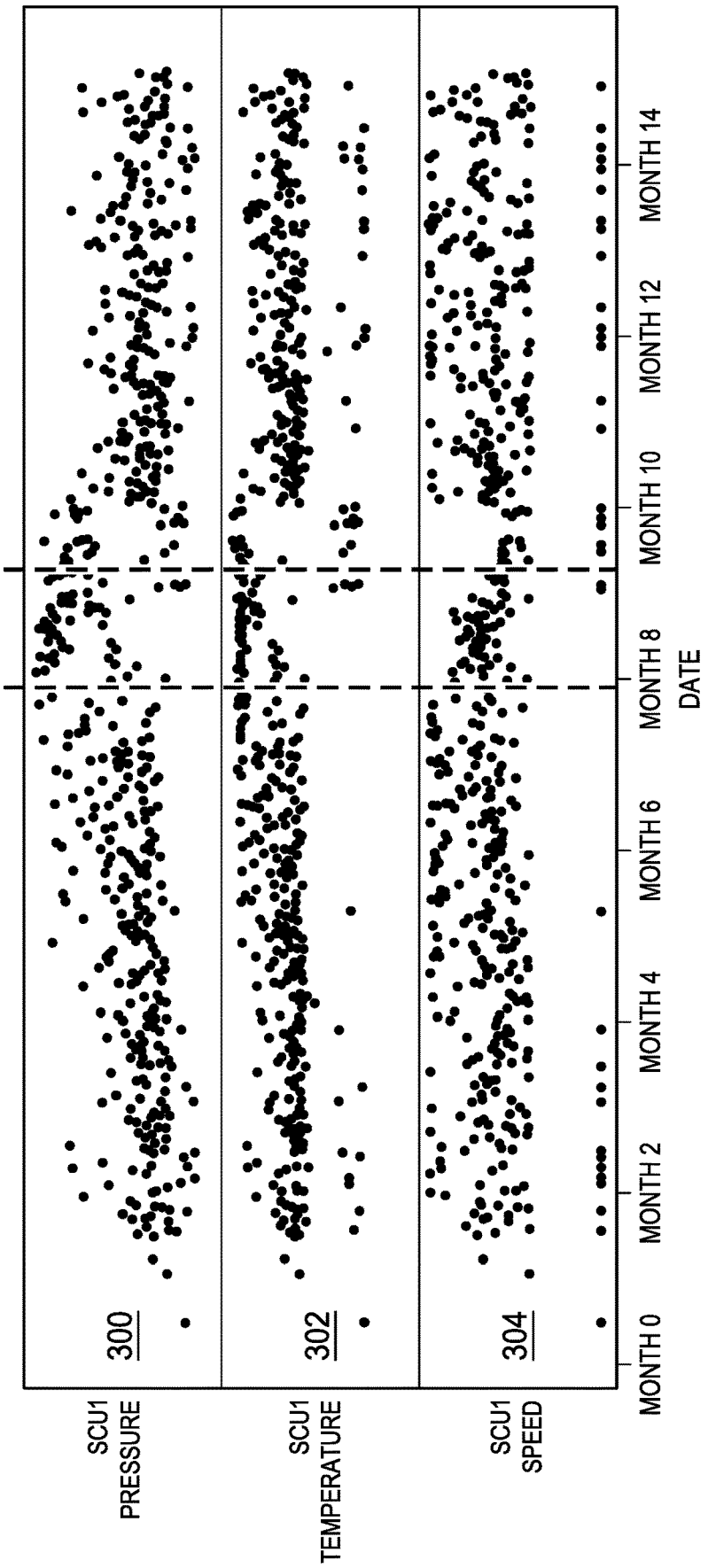
FIG. 3 is an illustration of graphs illustrating data collected for a supplemental cooling unit in which a reduction in performance results from a clogged filter in accordance with an illustrative embodiment.

With reference to FIG. 3, an illustration of graphs illustrating data collected for a supplemental cooling unit in which a reduction in performance results from a clogged filter is depicted in accordance with an illustrative embodiment. The data in this example was collected over an 18-month period of time and is an example of a signature such as signature 134 in FIG. 1. This data can be used to train machine learning models to generate alerts.

In this illustrative example, graph 300 is for outlet pressure in a supplemental cooling; graph 302 is for outlet or discharge temperature in a supplemental cooling unit; and graph 304 is compressor speed for a compressor in a supplemental cooling unit.

In this illustrative example, an airplane condition monitoring system (ACMS) viewer can be used to research the data signature associated with these removals. The ACMS viewer is a Tableau visualization tool for the airplane condition monitoring system data. The ACMS viewer is available from Tableau Software, Inc. The supplemental cooling unit nonconformances and removals can be associated with an increase in temperature and pressure and a decrease in compressor speed. FIG. 3 shows an example of a signature associated with the clogged filter nonconformance mode.

This research can be used to identify historical signatures for use as training data to train machine learning models. Historical signatures comprising at least one of data signatures associated with failed supplemental cooling units, data signatures associated with failing supplemental cooling units, or data signatures with normal functioning can be used to train machine learning models to detect these conditions in signatures received in data from aircraft and to generate alerts.

Line 310 in the graphs is where elevated pressure and temperature are above a threshold and a start of a decrease in the speed is detected. This line can be when a first alert should be generated. Line 312 in the graphs is where elevated pressure and temperature are above a threshold and the speed decreases below a speed threshold. This line can be when a second alert should be generated.

The airplane condition monitoring system data can be used to identify supplemental cooling units that are in a state in which reduction in performance occurs rather than trying to predict a maintenance message. The presence of this reduction in performance can be used to generate a first alert.

Airplane condition monitoring system data was used to identify supplemental cooling units that exhibited the high temperature, high pressure and decreasing speed data signature. In this illustrative example, the high temperature and high pressure are temperatures and pressures that are above selected thresholds for these parameters. Thresholds be selected based on when a nonconformance mode is present for a supplemental cooling. The first alert can identify when supplemental cooling units that have reduced performance as close as possible to the speed decrease inflection point shown in FIG. 3 at line 310. This inflection in speed decrease is a trend or pattern in the signature that includes data for pressure, temperature, and speed.

In the illustrative example, a machine learning model, such as a random forest model, was trained and used as a first alert model to generate the first alert. This first alert model provided fairly accurate results on the order of 85% true catch rate and overall accuracy of 90%. The data comprised a sample of about 164 clean and supplemental cooling units with reductions in performance.

After detecting this first alert, a second alert can be used to supplement the first alert. While the first alert can identify supplemental cooling units with reductions in performance, it can also be desirable to have a window of time during which arrangements for removal of supplemental cooling unit for maintenance can be made. In one illustrative example, it is desirable to remove the supplemental cooling unit at a point where the supplemental cooling unit could still be reworked without sacrificing too much time on the wing.

Historical data for signatures from failed supplemental cooling units removed from aircraft can be used to identify an optimal point for removal such as at line 312 in the graphs. This optimal point for removal can be the second alert. The second alert can provide at least one of a maintenance window for performing maintenance on the supplemental cooling unit or reducing damage to the supplemental cooling unit.

Another machine learning model, random forest model, was created as a second alert model to identify a supplemental cooling unit that is approximately 30 flights from the bottom of the speed curve. The bottom of the speed curve is when the supplemental cooling unit is fully clogged and no longer functions. When the bottom of the speed curve is reached, the build-up forming the clog is such that pressure and temperature increase beyond some desired level that causes current systems in aircraft to cut power to the supplemental cooling. The second alert can be generated to avoid this situation and provides time to remove and replace the supplemental cooling unit.

This second alert model was trained to generate the second alert 30 flights before the compressor is fully clogged. The pattern for the speed that is 30 flights from the bottom can be determined in the signature from the aircraft that includes data for pressure, temperature, and data. The training of the second alert model can be formed using machine techniques in which signatures from normal supplemental cooling units and signatures from failed supplemental cooling units are used as training data. The second alert model has a false positive rate between 15-20% and an overall accuracy of 80% on the test data.

In some illustrative examples, the data that forms the signature for analysis can be collected over different time intervals instead of or in addition to the 18-month period shown in graph 300, graph 302, and graph 304 that a signature can be collected from a single flight of aircraft 108.

Thus, the first alert can provide an early warning that a supplemental cooling unit is degrading. The first alert can provide time to prepare paperwork, locate a spare supplemental cooling unit, schedule time for service, and other actions. The second alert can provide an indication that the supplemental cooling unit may fail within some window. This window can be, for example, four weeks, 30 flights, or some other suitable type of window that provides time to take action to isolate or remove the supplemental cooling unit in a manner that reduces expense, disruption of schedules, or other undesired effects of a failed supplemental cooling unit.

Figure 4:
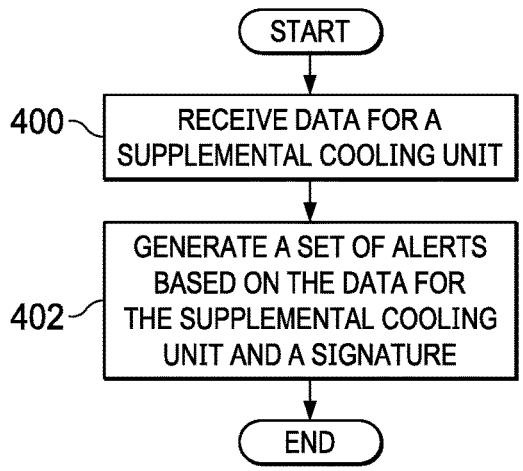
FIG. 4 is an illustration of a flowchart of an example process for managing a supplemental cooling unit in accordance with an illustrative embodiment.

Turning next to FIG. 4, an illustration of a flowchart of an example process for managing a supplemental cooling unit is depicted in accordance with an illustrative embodiment. The process in FIG. 4 can be implemented in hardware, software, or both. When implemented in software, the process can take the form of program code that is run by one of more processor units located in one or more hardware devices in one or more computer systems. For example, the process can be implemented in system manager 102 in computer system 104 in FIG. 1.

The process begins by receiving data for a supplemental cooling unit (operation 400). In operation 400, the data comprises a pressure, a temperature, and a speed. This data can be received during a flight of an aircraft, after the flight of the aircraft, or some combination thereof.

The process generates a set of alerts based on the data for the supplemental cooling unit and a signature (operation 402). The process terminates thereafter. In this illustrative example, the signature identifies when the set of alerts should be generated based on changes in pressure, temperature, and speed. For example, the changes can be increases in the pressure, increases in the temperature, and decreases in the speed that breach a threshold value for these parameters.

Figure 5:
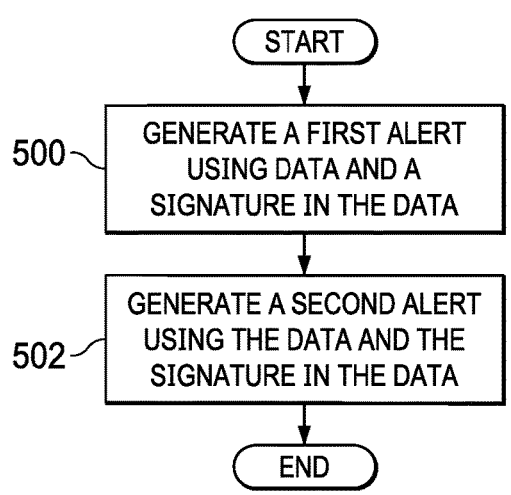
FIG. 5 is an illustration of a flowchart of an example process for generating alerts in accordance with an illustrative embodiment.

With reference next to FIG. 5, an illustration of a flowchart of an example process for generating alerts is depicted in accordance with an illustrative embodiment. The process illustrated in FIG. 5 is an example of one implementation for operation 402 in FIG. 4.

The process begins by generating a first alert using data and a signature in the data (operation 500). The first alert indicates a clog in a filter in a supplemental cooling unit. The process generates a second alert using the data and the signature in the data (operation 502). The process terminates thereafter. The second alert indicates that maintenance should be performed on the supplemental cooling unit. In response to the second alert, maintenance can be scheduled for the supplemental cooling unit.

Figure 6:
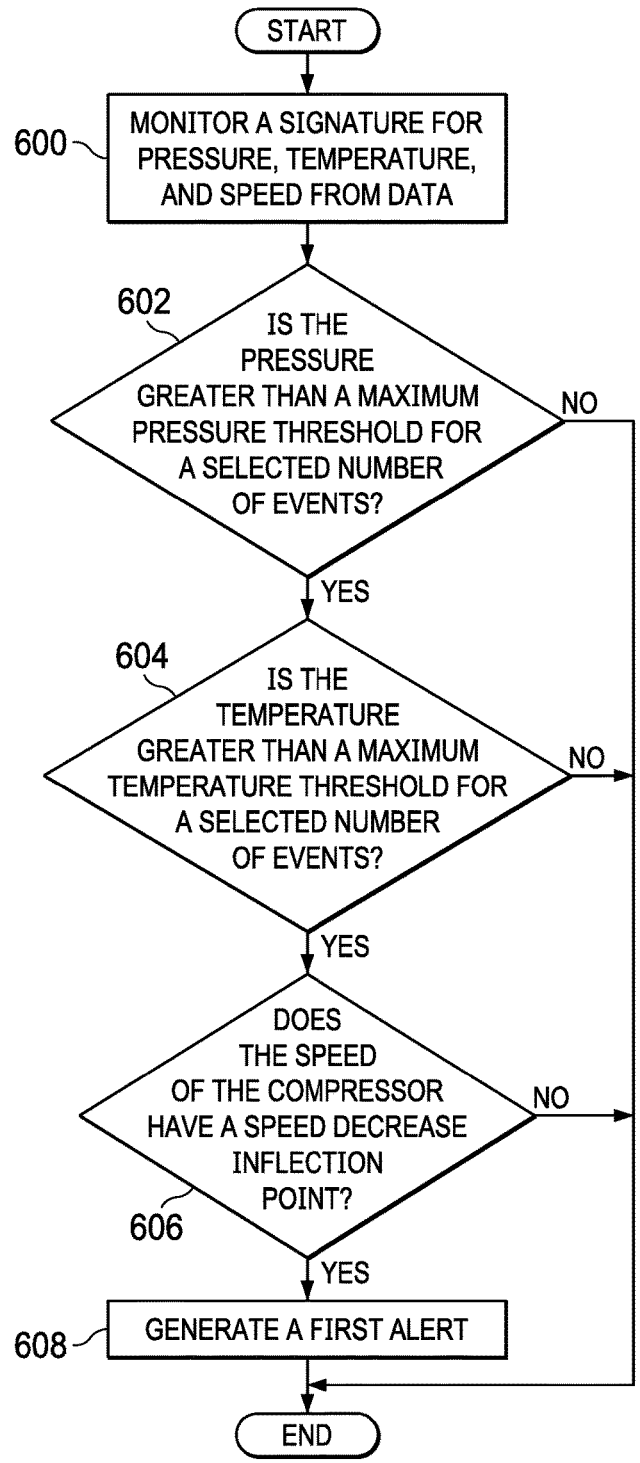
FIG. 6 is illustration of a flowchart for generating a first alert in accordance with an illustrative embodiment.

With reference next to FIG. 6, an illustration of a flowchart for generating a first alert is depicted in accordance with an illustrative embodiment. This flowchart is an example of one implementation for operation 500 in FIG. 5.

The process monitors a signature for pressure, temperature, and speed from data (operation 600). In operation 600, the process identifies the data needed for determining whether a first alert should be generated.

The process determines whether the pressure is greater than a maximum pressure threshold for a selected number of events (operation 602). In this illustrative example, an event in the selected number of events can be a periodic event such as a minute. With this example, the determination is whether the pressure is greater than the maximum pressure threshold for a selected number of minutes. In another example, the event can be a non-periodic event such as a flight. The determination in this example is whether the pressure is greater than the maximum pressure threshold for a selected number of flights. As depicted, the selected number of flights can be one, two, 15, or some other number of flights. Additionally, the selected number of flights can be sequential within a window of flights. For example, the threshold can be that the pressure is greater than the maximum pressure threshold for 10 flights within a window of 30 flights.

As used herein, a "number of," when used with respect to items is one or more items. For example, a selected "number of events" is one or more selected number of events.

If the pressure is greater than the maximum pressure threshold for the selected number of events, the process determines whether the temperature is greater than a maximum temperature threshold for a selected number of events (operation 604). An event in the selected number of events can be a periodic event for a non-periodic event.

If the pressure is greater than the maximum pressure threshold for the selected number of events, a determination is made as to whether the speed of the compressor has a speed decrease inflection point (operation 606). In this illustrative example, the selected number of events for the pressure does not have to be the same number of events as the selected number of events for the temperature. These can be different numbers of events or the same number of events depending on the particular implementation.

If the speed of the compressor has the speed decrease inflection point, the process generates a first alert (operation 608). The process terminates thereafter.

With reference again to operation 602, if the pressure is not greater than a maximum pressure threshold for a selected number of events, the process terminates. The process also terminates in operation 604 if the pressure is not greater than the maximum pressure threshold for a selected number of events. The process yet also terminates in operation 606 if the speed of the compressor does not have a speed decrease inflection point.

Figure 7:
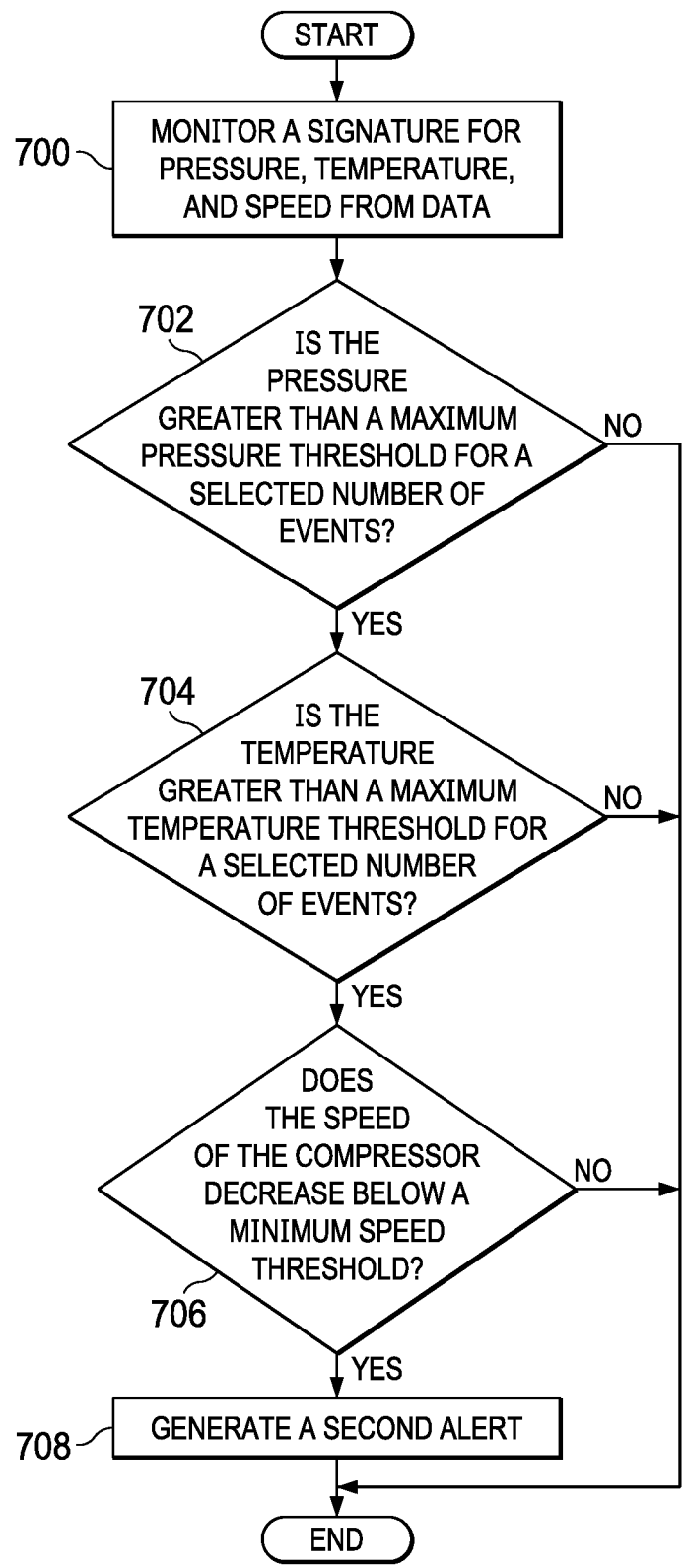
FIG. 7 is an illustration of a flowchart for generating a second alert in accordance with an illustrative embodiment.

With reference next to FIG. 7, an illustration of a flowchart for generating a first alert is depicted in accordance with an illustrative embodiment. This flowchart is an example of one implementation for operation 502 in FIG. 5.

The process monitors a signature for pressure, temperature, and speed from data (operation 700). In operation 700, the process identifies the data needed for determining whether the second alert should be generated.

The process determines whether the pressure is greater than a maximum pressure threshold for a selected number of events (operation 702). In this illustrative example, an event in the selected number of events can be a periodic event or a non-periodic event.

If the pressure is greater than the maximum pressure threshold for the selected number of events, the process determines whether the temperature is greater than a maximum temperature threshold for a selected number of events (operation 704). In operation 704, an event in the selected number of events can be a periodic event or a non-periodic event.

If the pressure is greater than the maximum pressure threshold for the selected number of events, a determination is made as to whether the speed of the compressor decreases below a minimum speed threshold (operation 706). If the speed of the compressor decreases below the minimum speed threshold, the process generates a second alert (operation 708). The process terminates thereafter. In other examples, the speed can be monitored for a trend or pattern that indicates that the supplemental cooling unit will fail with some predicted amount of time or number of flights.

With reference again to operation 702, if the pressure is not greater than a maximum pressure threshold for a selected number of events, the process terminates. The process also terminates in operation 704 if the temperature is not greater than the maximum temperature threshold for a selected number of events. The process yet also terminates in operation 706 if the speed of the compressor does not decrease below a minimum speed threshold.

Turning now to FIG. 8, an illustration of a flowchart of an example of a process for managing a supplemental cooling unit is depicted in accordance with an illustrative embodiment. The process in FIG. 8 can be implemented in hardware, software, or both. When implemented in software, the process can take the form of program code that is run by one or more processor units located in one or more hardware devices in one or more computer systems. For example, the process can be implemented in system manager 102 in computer system 104 in FIG. 1. This process is initiated or begins when a second alert is generated.

The process removes or replaces a supplemental cooling unit or isolates the supplemental cooling unit (operation 800). The process terminates thereafter. The isolation can be such that the supplemental cooling unit does not operate during the flight of the aircraft.

In illustrative example, a number of supplemental cooling units can be present in series. The isolation can result in the supplemental cooling unit being isolated or bypassed such that the other supplemental cooling units continue to operate during the flight of aircraft. The scheduling maintenance can result in the removal and replacement of the supplemental cooling unit sometime after the flight of aircraft.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the example process in the flowchart in FIG. 5 can omit generating the first alert. Instead, the process can generate a second alert when supplemental cooling is at the threshold of not being able to operate as desired.

Turning now to FIG. 9, an illustration of a block diagram of an example data processing system is depicted in accordance with an illustrative embodiment. Data processing system 900 can be used to implement computer system 104 in FIG. 1. In this illustrative example, data processing system 900 includes communications framework 902, which provides communications between processor unit 904, memory 906, persistent storage 908, communications unit 910, input/output (I/O) unit 912, and display 914. In this example, communications framework 902 takes the form of a bus system.

Processor unit 904 serves to execute instructions for software that can be loaded into memory 906. Processor unit 904 includes one or more processors. For example, processor unit 904 can be selected from at least one of a multicore processor, a central processing unit (CPU), a graphics processing unit (GPU), a physics processing unit (PPU), a digital signal processor (DSP), a network processor, or some other suitable type of processor.

Memory 906 and persistent storage 908 are examples of storage devices 916. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 916 may also be referred to as computer-readable storage devices in these illustrative examples. Memory 906, in these examples, can be, for example, a random-access memory or any other suitable volatile or non-volatile storage device. Persistent storage 908 can take various forms, depending on the particular implementation.

For example, persistent storage 908 may contain one or more components or devices. For example, persistent storage 908 can be a hard drive, a solid-state drive (SSD), a flash memory, a rewritable optical disk, a rewritable magnetic tape, or some combination of the above. The media used by persistent storage 908 also can be removable. For example, a removable hard drive can be used for persistent storage 908.

Communications unit 910, in these illustrative examples, provides for communications with other data processing systems or devices. In these illustrative examples, communications unit 910 is a network interface card.

Input/output unit 912 allows for input and output of data with other devices that can be connected to data processing system 900. For example, input/output unit 912 can provide a connection for user input through at least one of a keyboard, a mouse, or some other suitable input device. Further, input/output unit 912 can send output to a printer. Display 914 provides a mechanism to display information to a user.

Instructions for at least one of the operating system, applications, or programs can be located in storage devices 916, which are in communication with processor unit 904 through communications framework 902. The processes of the different embodiments can be performed by processor unit 904 using computer-implemented instructions, which can be located in a memory, such as memory 906.

These instructions are referred to as program code, computer usable program code, or computer-readable program code that can be read and executed by a processor in processor unit 904. The program code in the different embodiments can be embodied on different physical or computer-readable storage media, such as memory 906 or persistent storage 908.

Program code 918 is located in a functional form on computer-readable media 920 that is selectively removable and can be loaded onto or transferred to data processing system 900 for execution by processor unit 904. Program code 918 and computer-readable media 920 form computer program product 922 in these illustrative examples. In the illustrative example, computer-readable media 920 is computer-readable storage media 924.

In these illustrative examples, computer-readable storage media 924 is a physical or tangible storage device used to store program code 918 rather than a medium that propagates or transmits program code 918.

Alternatively, program code 918 can be transferred to data processing system 900 using a computer-readable signal media. The computer-readable signal media can be, for example, a propagated data signal containing program code 918. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 900 are not meant to provide architectural limitations to the manner in which different embodiments can be implemented. In some illustrative examples, one or more of the components may be incorporated in or otherwise form a portion of, another component. For example, memory 906, or portions thereof, can be incorporated in processor unit 904 in some illustrative examples. The different illustrative embodiments can be implemented in a data processing system including components in addition to or in place of those illustrated for data processing system 900. Other components shown in FIG. 9 can be varied from the illustrative examples shown. The different embodiments can be implemented using any hardware device or system capable of running program code 918.

Figure 10:
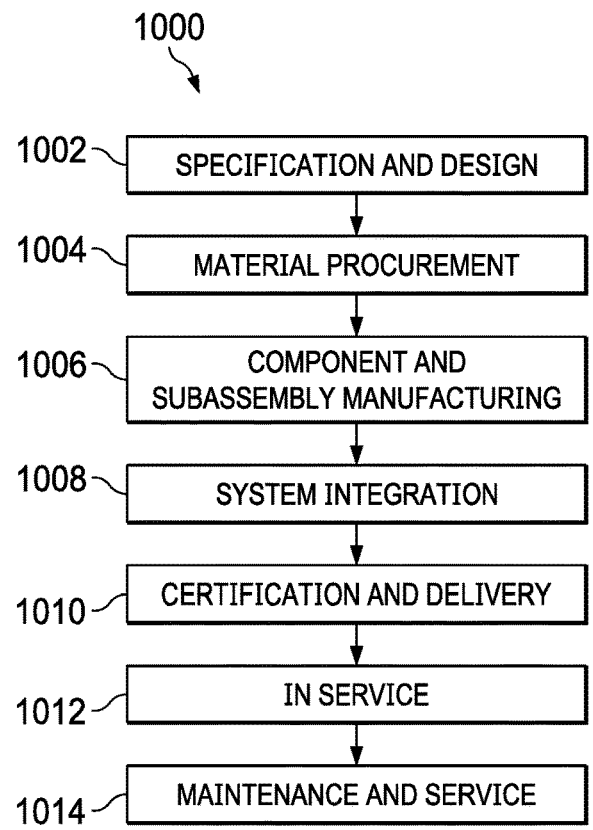
FIG. 10 is an illustration of a block diagram of an aircraft manufacturing and service method in accordance with an illustrative embodiment.
Figure 11:
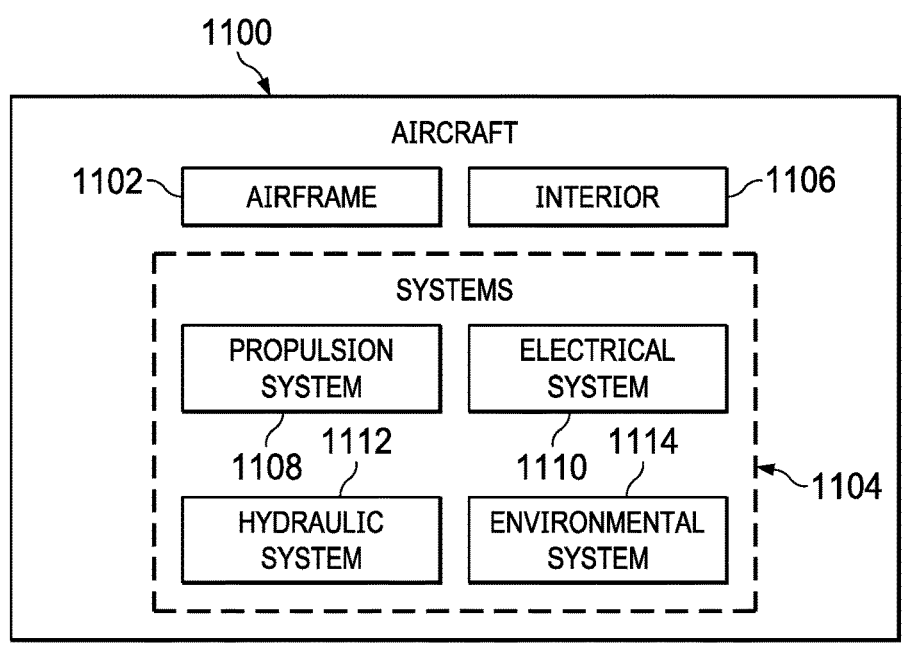
FIG. 11 is an illustration of a block diagram of an aircraft in which an illustrative embodiment may be implemented.

Illustrative embodiments of the disclosure may be described in the context of aircraft manufacturing and service method 1000 as shown in FIG. 10 and aircraft 1100 as shown in FIG. 11. Turning first to FIG. 10, an illustration of a block diagram of an aircraft manufacturing and service method is depicted in accordance with an illustrative embodiment. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 in FIG. 11 takes place. Thereafter, aircraft 1100 in FIG. 11 can go through certification and delivery 1010 in order to be placed in service 1012. While in service 1012 by a customer, aircraft 1100 in FIG. 11 is scheduled for routine maintenance and service 1014, which may include modification, reconfiguration, refurbishment, and other maintenance or service.

Each of the processes of aircraft manufacturing and service method 1000 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft is depicted in which an illustrative embodiment may be implemented. In this example, aircraft 1100 is produced by aircraft manufacturing and service method 1000 in FIG. 10 and may include airframe 1102 with plurality of systems 1104 and interior 1106. Examples of systems 1104 include one or more of propulsion system 1108, electrical system 1110, hydraulic system 1112, and environmental system 1114. In this illustrative example, a supplemental cooling unit monitored can be a component or a subsystem within environmental system 1114. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1000 in FIG. 10.

In one illustrative example, components or subassemblies produced in component and subassembly manufacturing 1006 in FIG. 10 can be fabricated or manufactured in a manner similar to components or subassemblies produced while aircraft 1100 is in service 1012 in FIG. 10. As yet another example, one or more apparatus embodiments, method embodiments, or a combination thereof can be utilized during production stages, such as component and subassembly manufacturing 1006 and system integration 1008 in FIG. 10. One or more apparatus embodiments, method embodiments, or a combination thereof may be utilized while aircraft 1100 is in service 1012, during maintenance and service 1014 in FIG. 10, or both. The use of a number of the different illustrative embodiments may substantially expedite the assembly of aircraft 1100, reduce the cost of aircraft 1100, or both expedite the assembly of aircraft 1100 and reduce the cost of aircraft 1100.

Thus, the illustrative examples provide a method, apparatus, and system for predicting when a supplemental cooling system needs maintenance. One or more illustrative examples solve a technical problem with an unpredicted nonconformance of a supplemental cooling unit that can cause delays in normal operation of an aircraft. A signature in the data from an aircraft can identify when a set of alerts should be generated based on increases in the pressure, increases in the temperature, and decreases in the speed. The selection of thresholds and trends or patterns can be made using a machine learning model that has been trained using historical data from supplemental cooling units.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a supplemental cooling unit, the method comprising:
   receiving, by a computer system, data for a supplemental cooling unit, wherein the data comprises a pressure, a temperature, and a speed, wherein the data is received during flight of an aircraft, after the flight of the aircraft, or some combination thereof; and
   generating, by the computer system, a set of alerts based on the data for the supplemental cooling unit and a signature in the data.

2. The method of claim 1, wherein the signature in the data identifies when the set of alerts should be generated based on increases in the pressure, increases in the temperature, and decreases in the speed.

3. The method of claim 1, wherein generating, by the computer system, the set of alerts based on the data for the supplemental cooling unit and the signature in the data comprises:
   generating, by the computer system, a first alert using data and the signature in the data, wherein the first alert indicates a clog in a filter in the supplemental cooling unit.

4. The method of claim 3, wherein generating, by the computer system, the set of alerts based on the data for the supplemental cooling unit and the signature in the data further comprises:
   generating, by the computer system, a second alert using the data and the signature in the data, wherein the second alert provides at least one of a maintenance window for performing maintenance on the supplemental cooling unit or reducing damage to the supplemental cooling unit.

5. The method of claim 4 further comprising:
   scheduling, by the computer system, maintenance for the supplemental cooling unit in response to generating the second alert.

6. The method of claim 4 further comprising:
   isolating, by the computer system, the supplemental cooling unit in response to generating the second alert.

7. The method of claim 1, wherein a first set of the data is received during a climb phase of flight of the aircraft and a second set of the data is received during a cruise phase of flight of the aircraft.

8. The method of claim 1 further comprising:
   identifying, by the computer system, the signature in the data indicating when a nonconformance mode is present in the supplemental cooling unit, wherein the signature in the data includes values for the pressure, the temperature, and the speed that results in generating the set of alerts.

9. The method of claim 1, wherein the data is one of a compressor outlet pressure for a compressor in the supplemental cooling unit, the temperature for a refrigerant fluid in the compressor, and the speed at which the compressor operates.

10. The method of claim 3, wherein generating, by the computer system, the set of alerts based on the data for the supplemental cooling unit and the signature in the data further comprises:

generating, by the computer system, a second alert using the data and the signature in the data, wherein the second alert indicates that maintenance should be performed on the supplemental cooling unit.

11. An aircraft management system comprising:
a computer system; and
a system manager in the computer system, wherein the system manager receives data for a supplemental cooling unit, wherein the data comprises a pressure, a temperature, and a speed, wherein the data is received during flight of an aircraft, after the flight of the aircraft, or some combination thereof and the system manager generates a set of alerts based on the data for the supplemental cooling unit and a signature in the data.

12. The aircraft management system of claim 11, wherein the signature in the data is used to identify when the set of alerts should be generated based on increases in the pressure, increases in the temperature, and decreases in the speed.

13. The aircraft management system of claim 11, wherein in generating the set of alerts, the system manager generates a first alert using data and the signature in the data, wherein a first alert indicates a clog in a filter in the supplemental cooling unit.

14. The aircraft management system of claim 13, wherein in generating the set of alerts, the system manager generates a second alert using the data and the signature in the data, wherein the second alert indicates that maintenance should be performed on the supplemental cooling unit.

15. The aircraft management system of claim 14, wherein the system manager schedules maintenance for the supplemental cooling unit in response to generating the second alert.

16. The aircraft management system of claim 14, wherein the system manager isolates the supplemental cooling unit in response to generating the second alert.

17. The aircraft management system of claim 11, wherein a first set of the data is received during a climb phase of flight of the aircraft and a second set of the data is received during a cruise phase of flight of the aircraft.

18. The aircraft management system of claim 11, wherein the system manager identifies the signature in the data indicating when a nonconformance mode is present in the supplemental cooling unit, wherein the signature in the data includes values for at least one of the pressure, the temperature, or the speed that results in generating the set of alerts.

19. The aircraft management system of claim 11, wherein the data is one of a compressor outlet pressure for a compressor in the supplemental cooling unit, the temperature for a refrigerant fluid in the compressor, and the speed at which the compressor operates.

20. The aircraft management system of claim 13, wherein in generating the set of alerts, the system manager generates a second alert using the data and the signature in the data, wherein the second alert provides a maintenance window for performing maintenance on the supplemental cooling unit.

* * * * *